(Model.)

W. C. L. VAN SCHAIK.
MEANS FOR CONTROLLING FLOW OF LIQUIDS.

No. 599,462. Patented Feb. 22, 1898.

Attest:
George H. Bott
J. J. Kennedy

Inventor:
Willem Cornelis Loran van Schaik
by Philipp Munson & Phelps,
Attys

UNITED STATES PATENT OFFICE.

WILLEM CORNELIS LORAN VAN SCHAIK, OF ROTTERDAM, NETHERLANDS.

MEANS FOR CONTROLLING FLOW OF LIQUIDS.

SPECIFICATION forming part of Letters Patent No. 599,462, dated February 22, 1898.

Application filed August 27, 1895. Serial No. 560,634. (Model.) Patented in England August 8, 1894, No. 15,148; in Germany March 3, 1895, No. 83,004; in Belgium March 11, 1895, No. 114,517, and in Austria June 1, 1895, No. 45/1,964.

*To all whom it may concern:*

Be it known that I, WILLEM CORNELIS LORAN VAN SCHAIK, doctor of philosophy, a subject of the Queen of the Netherlands, residing at Rotterdam, in the Kingdom of the Netherlands, have invented new and useful Improvements in Means for Controlling the Flow of Liquids, (for which I have obtained a patent in Great Britain, No. 15,148, dated August 8, 1894; in Germany, No. 83,004, dated March 3, 1895; in Belgium, No. 114,517, dated March 11, 1895, and in Austria, No. 45/1,964, dated June 1, 1895,) whereof the following is a specification.

This invention relates to improvements in means for controlling the flow of liquids in such a manner that an automatic closing is obtained; and the object of this invention is to secure the operation by a very slight force and to provide a tight closure independently of the will of the operator after the passage of an adjustable amount of liquid, and this without causing "hammering" in the supply-pipe. I attain these objects by an arrangement of parts substantially as illustrated in the accompanying drawings, in which—

Figure 1:
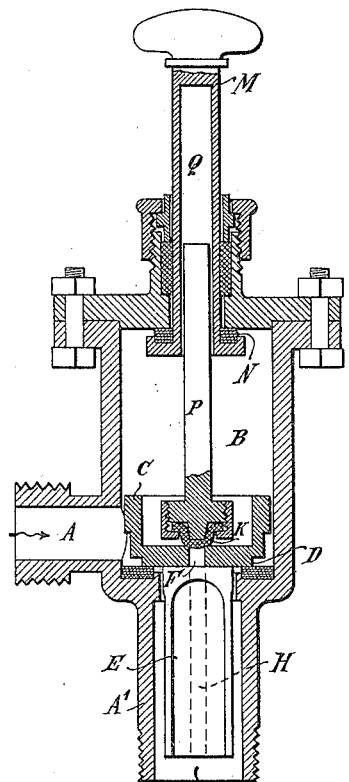
Figure 2:
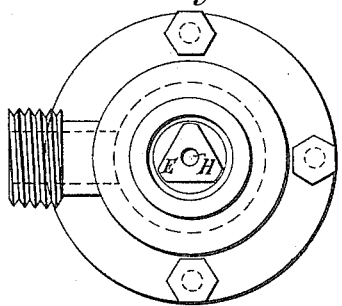

Figure 1 is a vertical section, and Fig. 2 an under-side view, illustrating, by way of example, an arrangement of draw-off tap or controlling device constructed according to this invention.

The supply-pipe A opens into a cylinder B, in the bottom of which there is arranged a differential valve C D. The upper portion C of this valve is formed as a piston, but does not closely fit the wall of the cylinder B, while the lower portion is of smaller diameter and coöperates with a jointing-washer D to form a valve situated between the cylinder B and discharge-pipe A'. The differential valve terminates in a guide-piece E, which extends through an opening in the bottom of the cylinder into the discharge-pipe A' and is so shaped, as shown, that it will not hinder the flow of liquid through the said opening after the differential valve has lifted. Through the body and exterior E of the valve there is led a subsidiary passage H. The washer K, made of leather, india-rubber, or consisting of a movable piece of metal or other material, which normally closes the opening F at the upper end of the said passage H, is carried by the head of a rod P, which fits freely in the cavity Q of a handle M, the diameter of the cavity exceeding that of the rod P about one-fiftieth of a millimeter, so that when the rod P, for example, is pushed upward into the cavity (the air confined in the cavity above the rod P thereby escaping downward) it will slowly move down again, its movement in this direction being retarded by a partial vacuum created by its downward movement in the space between the upper part of the cavity and the upper end of the rod P. The handle is provided with a washer at N to render it normally fluid-tight at the upper side of cylinder B.

When the apparatus is in the position of rest, assumed to be the case in Fig. 1 of the drawings—that is to say, when the passages A' and H, controlled by D and K, are closed—there exists in the apparatus the pressure existing in the supply-pipe A.

In order to set the apparatus in operation, the handle M is pressed down, the cavity Q therein moving over the rod P. The handle is then raised, whereby the rod P by means of the atmospheric pressure working on the lower side of the head of rod P in consequence of the vacuum above rod P in the cavity Q is carried up with it. As the passage F H will be thereby opened, liquid will flow out from the upper part of the vessel or cylinder B into the subsidiary passage F H. In consequence thereof the differential valve will rise and liquid will flow out of the supply-pipe A directly into the discharge-pipe A'. This direct flow from A through the pipe A', which is opened by the lifting of the valve C D, is limited by the time which is required by the said valve to move up and then down in the cylinder B. In its upward movement it will strike against the head of the rod P, add to the retardation of the downward movement of this rod P, and then return gradually with the latter back into its original position. (Shown in Fig. 1.) The passage F H in this way is first closed by means of the washer K, while the differential valve C D in consequence of the difference in fluid-pressure upon its two parts, and aided by its own weight, is caused gradually to move down unto its seat, thereby closing the outlet-opening by means of the washer D. The said self-closing of the subsidiary passage F H allows of a certain regulation with respect to the time of opening of the discharge-pipe A', inasmuch as this time is longest when the handle has been completely depressed and then quickly raised, the time of opening being shortened in proportion as the handle M is depressed to a smaller extent, and is then raised solely by the hydrostatic pressure thereon. On the outlet-opening being closed by the washer K and differential valve C D the apparatus is allowed to become again filled from the supply-pipe A through the space between the piston-shaped part C of the valve and the cylinder B.

The only resistance to be overcome in using the apparatus being essentially the friction of the handle it is evident that the operation requires but very slight force.

In consequence of the automatic closure of the subsidiary conduit F H only a determined quantity of liquid is delivered each time the apparatus is operated. The consumer cannot keep the main supply-passage open as long as he likes.

What I claim as my invention, and desire to secure by Letters Patent, is—

In an apparatus for drawing off liquids the combination of a cylinder with the supply-pipe opening therein, a differential valve, the upper portion of which forms a piston, not closely fitting the wall of the cylinder, a subsidiary passage in the said valve, controlled by a washer, a rod carrying the washer and fitting freely in the cavity of a handle, capable of being moved down and up by the consumer, substantially as set forth.

In testimony whereof I have hereunto set my hand in the presence of two subscribing witnesses.

WILLEM CORNELIS LORAN VAN SCHAIK.

Witnesses:
H. M. GILLORY,
AVIR W. VONTYDER.